United States Patent

[11] 3,629,772

[72] Inventor Leroy E. Beightol
 Los Angeles, Calif.
[21] Appl. No. 800,610
[22] Filed Feb. 19, 1969
[45] Patented Dec. 21, 1971
[73] Assignee Solar Laboratories, Inc.
 Torrance, Calif.
 Continuation-in-part of application Ser. No. 790,307, Jan. 10, 1969. This application Feb. 19, 1969, Ser. No. 800,610

[54] NOVEL THERMISTOR AND METHOD OF MAKING
 5 Claims, 5 Drawing Figs.
[52] U.S. Cl. .................................................. 338/28,
 338/300, 29/612, 29/620
[51] Int. Cl. ...................................................... H01c 7/04
[50] Field of Search ............................................ 338/25, 28,
 29, 30; 29/612, 620

[56] References Cited
 UNITED STATES PATENTS
 2,349,614  5/1944  Denisoff et al ................. 338/28 E X
 3,414,864 12/1968  Barrington .................... 338/300

Primary Examiner—Rodney D. Bennett, Jr.
Assistant Examiner—R. Kinberg
Attorney—Finkelstein & Mueth ABSTRACT: This patent describes a thermistor comprising a plastic body member of a generally cylindrical configuration having an opening passing longitudinally therethrough, a plurality of threads on the exterior of said body in proximity to one end thereof, a thin metal film within the grooves but not on the lands of said threads and metal disposed on the exterior and interior of said body to establish a continuous metal path from the exterior of the end opposite said end having threads to the interior of said end opposite said end having threads, said metal path being composed of an electrically conductive metal having a high-temperature coefficient of resistivity.

PATENTED DEC 21 1971

3,629,772

INVENTOR.
LEROY E. BEIGHTOL
BY
Lyon & Lyon
ATTORNEYS

NOVEL THERMISTOR AND METHOD OF MAKING

BACKGROUND OF THE INVENTION

Various temperature measuring devices have been used including mercury thermometers, thermocouples, bimetallic strips, and the like. Most of these devices must be constructed of fragile glass and/or expensive metal components. The known devices which are made of sturdy inexpensive materials generally are not capable of accurately measuring small temperature changes, The present invention is directed to a new temperature measuring device which is uniquely suited for the measurement of relatively small changes of temperature by means of components which are inexpensive to manufacture. The device of the present invention can be easily manufactured on a large scale without the need for large amounts of expensive metals.

SUMMARY OF THE INVENTION

Briefly, the present invention comprises a thermistor comprising a plastic body member of a generally cylindrical configuration having an opening passing longitudinally therethrough, a plurality of threads on the exterior of said body in proximity to one end thereof, a thin metal film within the grooves but not on the lands of said threads and metal disposed on the exterior and interior of said body to establish a continuous metal path from the exterior of the end opposite said end having threads to the interior of said end opposite said end having threads, said metal path being composed of an electrically conductive metal having a high temperature coefficient of resistivity.

The invention also comprises the method of making a thermistor which comprises molding a plastic body member having a generally cylindrical configuration having an opening passing longitudinally therethrough and a plurality of threads on the exterior of said body in proximity to one end thereof, coating the inside and outside surface of said body with a thin electrically conductive metal film having a high temperature coefficient of restitivity, and removing said film from the lands of said threads but not the grooves of said threads to establish a continuous metal path from the exterior of the end opposite said end having threads to the interior of said end opposite said end having threads.

It is an object of the present invention to provide a novel component for the measurement of the change of temperature. It is a particular object of the present invention to provide a novel component for use in the measurement of temperature in the human body.

Still another object of the present invention is the provision of a novel means for the fabrication of a component useful for measuring temperature changes.

Additional objects and advantages of this invention will be evident from the more detailed description which follows taken in conjunction with the accompanying drawings.

DESCRIPTION OF PREFERRED EMBODIMENTS

Turning to the drawings

Figure 1:
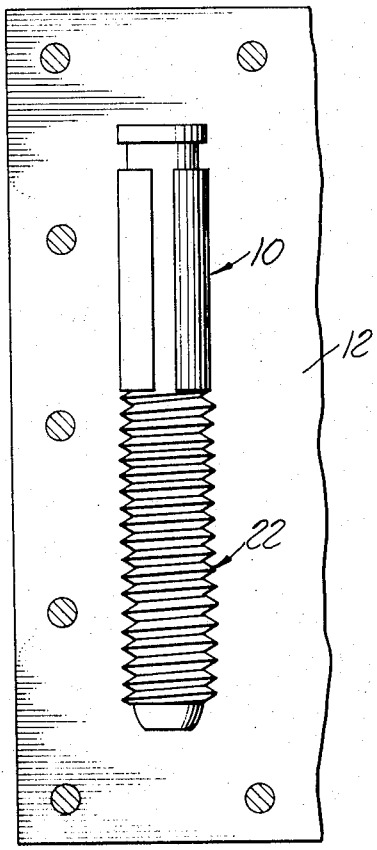
FIG. 1 is a plan view of a mold used to form the body of the thermistor.
Figure 2:
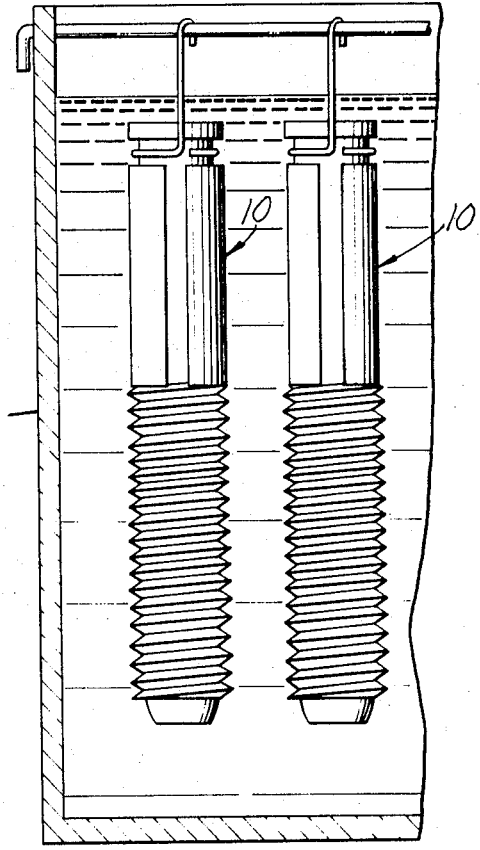
FIG. 2 shows the application of the conductive metal coating to several thermistor bodies in an electroless plating bath.
Figure 3:
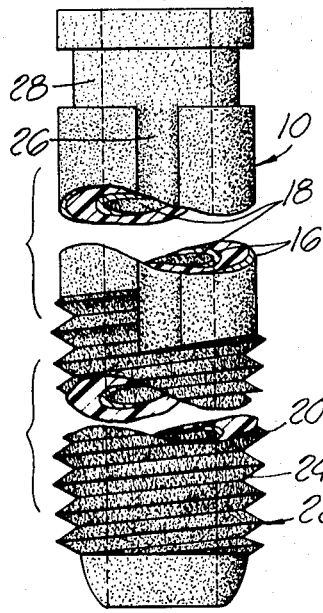
FIG. 3 shows a side view with portions broken away of a thermistor body after it has been metal coated.
Figure 4:
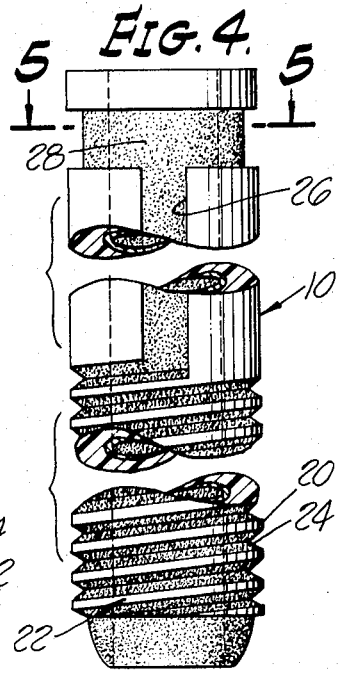
FIG. 4 shows the coated thermistor body of FIG. 3 after some of the metal has been buffed from parts of the exterior of the body; and FIG, 5 is a sectional view taken along the line 5–5 of FIG. 4.
Figure 5:
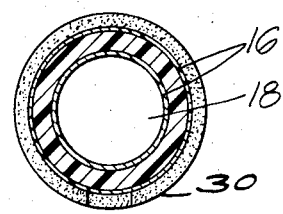

Turning to the drawings in greater detail, the thermistor body 10 may be formed, for example in a mold such as 12. Thermistor body 10 is then placed in a plating bath 14 where a metal coating 16 is applied to both the exterior and longitudinal interior opening 18. By the use of a buffer or grinder, metal is removed from the lands 20 of threads 22 leaving a metal path 24 within the grooves. The vertical metal path 26 and upper horizontal metal ring 28, as well as the metal on the interior of the body, are intended to be electrically connected to a power source.

The final body may be coated with a protective coating such as conformal coating 30. It is to be understood that the body of the thermistor is preferably injection molded, however, any other molding techniques are also applicable. The body can also be molded with smooth surfaces, in which case the threads are cut in by a subsequent operation. Likewise, while the use of plastic is preferred for the body it is to be understood that various other plastic like materials may be used such as the siloxanes. Preferred plastics include polycarbonate, or any other plateable plastic material. The metal coating is any material which has a high thermal coefficient such that its resistance changes markedly with the change in its temperature. Typical of such conductive metal is nickel, iron, platinum, rhodium, a mixture of temperature of 90 percent nickel and 10 percent iron, and other materials familiar to those skilled in the art. The device of the present invention is preferably used to measure the temperature of the human body as more fully described in the above-identified patent application. In this application the conductive metal coating is so selected that it has a high thermal coefficient within the temperature range of the body normally from about 94° F. to 106° F. When the device is to be used for other purposes such as to measure the temperature within an oven, obviously other metals having a high thermal coefficient within the operating range of the oven are used.

The conductive metal is preferably applied in an electroless plating bath. These baths and their composition are already familiar to those skilled in the art and, hence, need not be more fully described herein. However, other coating techniques including electrolysis and sputtering may also be used.

Having fully described the invention it is intended that it be limited only by the lawful scope of the appended claims.

I claim:

1. A thermistor comprising a plastic body member of a generally cylindrical configuration having an opening passing longitudinally therethrough, a plurality of threads on the exterior of said body in proximity to one end thereof, a thin metal film within the grooves but not on the lands of said threads and metal disposed on the exterior and interior of said body to establish a continuous metal path from the exterior of the end opposite said end having threads to the interior of said end opposite said end having threads, said metal path being composed of an electrically conductive metal having a high temperature coefficient of resistivity.

2. A thermistor comprising a plastic body member of a generally cylindrical configuration having an opening passing longitudinally therethrough, a plurality of threads on the exterior of said body in proximity to one end thereof, a thin metal film within the grooves but not on the lands of said threads and metal disposed on the exterior and interior os said body to establish a continuous metal path from the exterior of the end opposite said end having threads to the interior of said end opposite said end having threads, said metal path being composed of an electrically conductive metal having a high temperature coefficient of resistivity within the temperature range encountered in the human body.

3. A thermistor comprising a plastic body member of generally cylindrical configuration having a cylindrical opening passing longitudinally therethrough, a plurality of threads on the exterior of said body in proximity to one end thereof, a thin metal film within the grooves but not on the lands of said threads and metal disposed on the exterior and interior of said body to establish a continuous metal path form the exterior of the end opposite said end having threads to the interior of said end opposite said end having threads, said metal path being composed of an electrically conductive metal having a high temperature coefficient of restitivity within the temperature range encountered in the human body.

4. The method of making a thermistor which comprises molding a plastic body member having a generally cylindrical configuration having an opening passing longitudinally there through and a plurality of threads on the exterior of said body in proximity to one end thereof, coating the inside and outside surface of said body with a thin electrically conductive metal film having a high temperature coefficient of resistivity, and removing said film from the lands of said threads but not the grooves of said threads to establish a continuous metal path from the exterior of the end opposite said end having threads to the interior of said end opposite said end having threads.

5. The method of claim 4 wherein the thermistor is subsequently coated with a thin protective coating.

* * * * *